Figure 1:
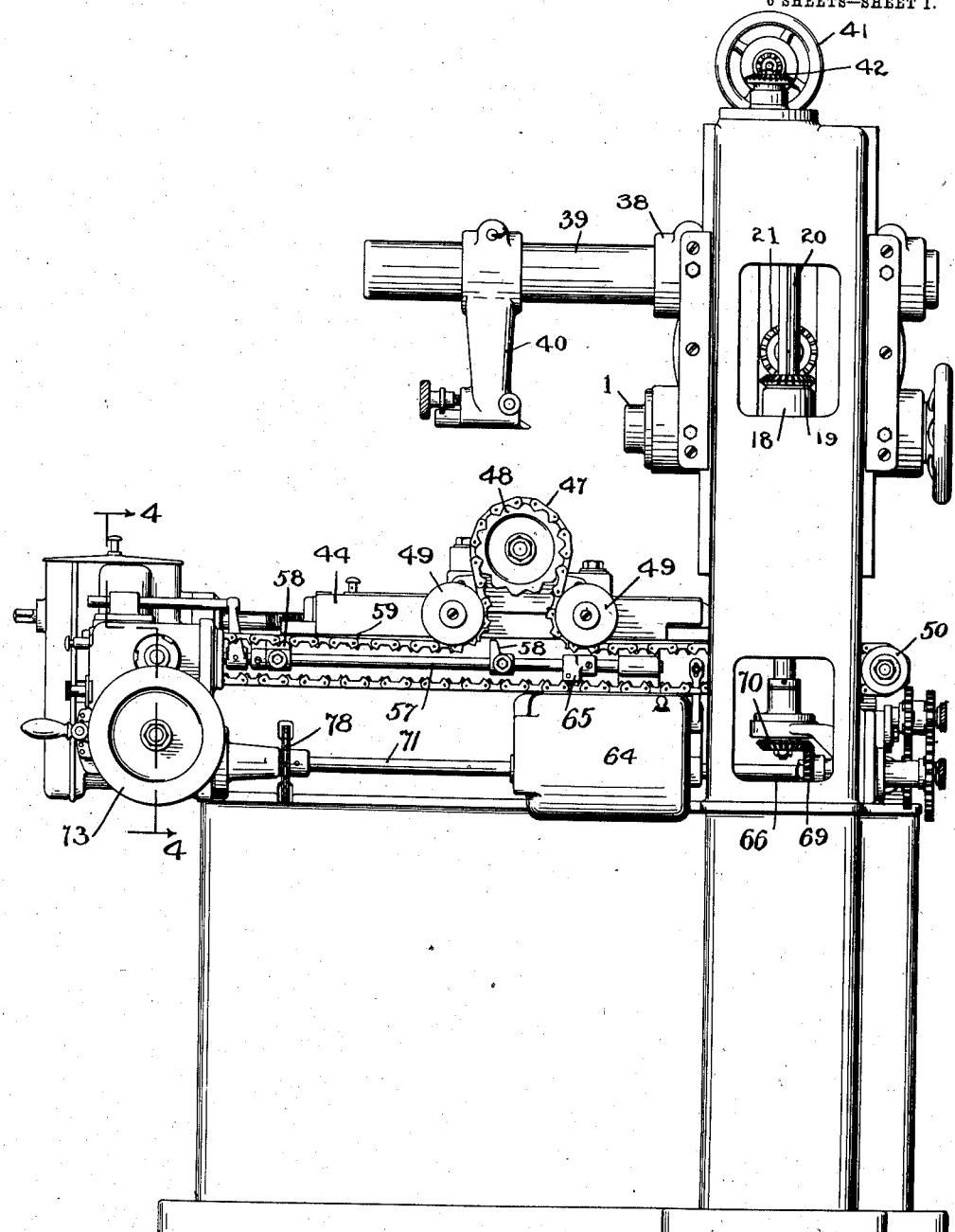

No. 846,505. PATENTED MAR. 12, 1907.
J. PARKER.
GEAR CUTTING MACHINE.
APPLICATION FILED NOV. 7, 1904.

6 SHEETS—SHEET 1.

WITNESSES:
Catherine G. Bradley
James H. Thurston

INVENTOR:
John Parker,
By Wilmarth H. Thurston,
Attorney.

No. 846,505. PATENTED MAR. 12, 1907.
J. PARKER.
GEAR CUTTING MACHINE.
APPLICATION FILED NOV. 7, 1904.

6 SHEETS—SHEET 2.

WITNESSES: INVENTOR:

No. 846,505. PATENTED MAR. 12, 1907.
J. PARKER.
GEAR CUTTING MACHINE.
APPLICATION FILED NOV. 7, 1904.
6 SHEETS—SHEET 4.
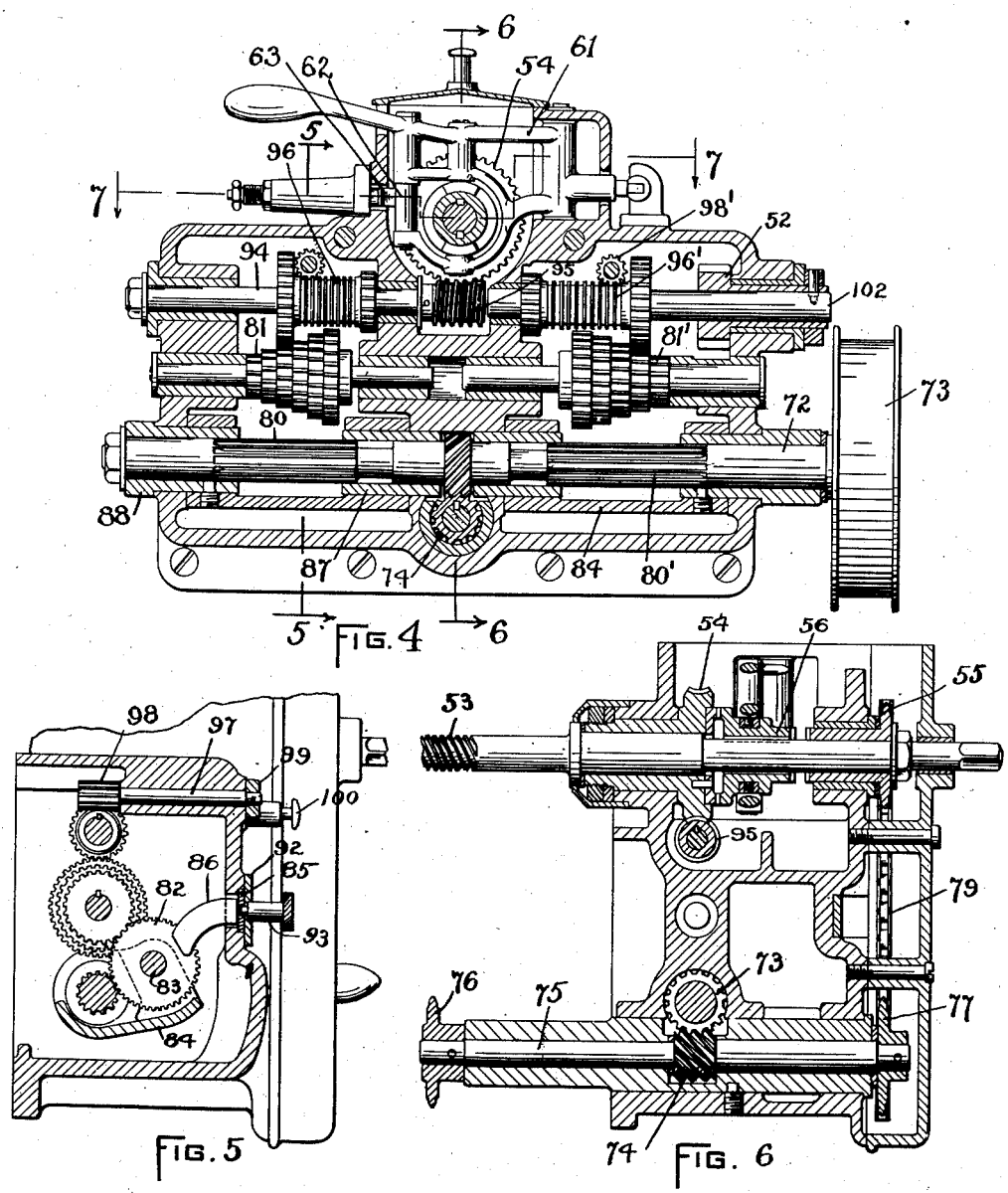
WITNESSES:
Catherine G. Bradley
James H. Thurston
INVENTOR:
John Parker
By Wilmarth H. Thurston,
Attorney.

No. 846,505.

PATENTED MAR. 12, 1907.

J. PARKER.
GEAR CUTTING MACHINE.
APPLICATION FILED NOV. 7, 1904.

6 SHEETS—SHEET 6.

WITNESSES:
Catherine G. Bradley
James H. Thurston

INVENTOR:
John Parker,
By Wilmarth H. Thurston,
Attorney.

UNITED STATES PATENT OFFICE.

JOHN PARKER, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

GEAR-CUTTING MACHINE.

No. 846,505.   Specification of Letters Patent.   Patented March 12, 1907.

Application filed November 7, 1904. Serial No. 231,748.

*To all whom it may concern:*

Be it known that I, JOHN PARKER, of the city and county of Providence and State of Rhode Island, have invented certain new and useful Improvements in Gear-Cutting Machines; and I do hereby declare the following specification, taken in connection with the accompanying drawings, forming a part of the same, to be a full, clear, and exact description thereof.

The invention relates to that class of spur and bevel gear cutters in which the gear-blank is supported upon a spindle which is indexed after each cut to bring the blank into position for the cutting of a new tooth and in which the cutting is performed by a rotary cutter mounted in a reciprocating cutter-carriage. Heretofore in gear-cutting machines of this type the cutter-carriage has been mounted upon a tilting bed, the angle of which could be varied to adapt the machine for cutting-gears of different angles. This construction involved comparatively complicated driving and reversing mechanism and also limited the range of work for which the machines could be used. For instance, with this construction of machine the cutter could cut only from the inside of the gear toward the outside, and the machine could not, therefore, be used to cut many bevel-gears having internal hubs. Neither could such machines be used to cut internal bevel-gears without the use of special attachments.

In practicing the present invention the work-carrying spindle is mounted in a swivel-head which may be adjusted to adapt the machine for cutting gears of varying angle. By thus mounting the work-carrying spindle the range of work which may be done upon the machine is greatly increased as compared with the former construction of bevel and spur gear cutting machines. This construction also enables the cutter-carriage to be mounted upon a fixed bed, with a resulting simplification of the driving and reversing mechanism which may be used for reciprocating the carriage.

The range of work which may be done by the machine is further increased by so constructing the work-carrying spindle that the work may be supported at either end thereof, or, in other words, by providing what may be termed a "double-ended work-carrying spindle." This form of spindle mounted in the swivel-head also enables the use of a shorter bed for supporting and guiding the cutter-carriage, with a resulting economy in space and in the cost of manufacturing the machine.

In practicing my invention I also provide the machine with a novel form of driving mechanism for the cutter-spindle and also with a novel construction and arrangement of the gearing and connections for driving the various mechanisms of the machine.

I have also embodied in the machine various features of invention relating more or less to the construction of various parts and connections.

The various features of the invention will be understood from the following detailed description of the machine in which I have embodied all such features in the forms in which I prefer to employ them.

This machine is shown in the accompanying drawings, in which—

Figure 2:
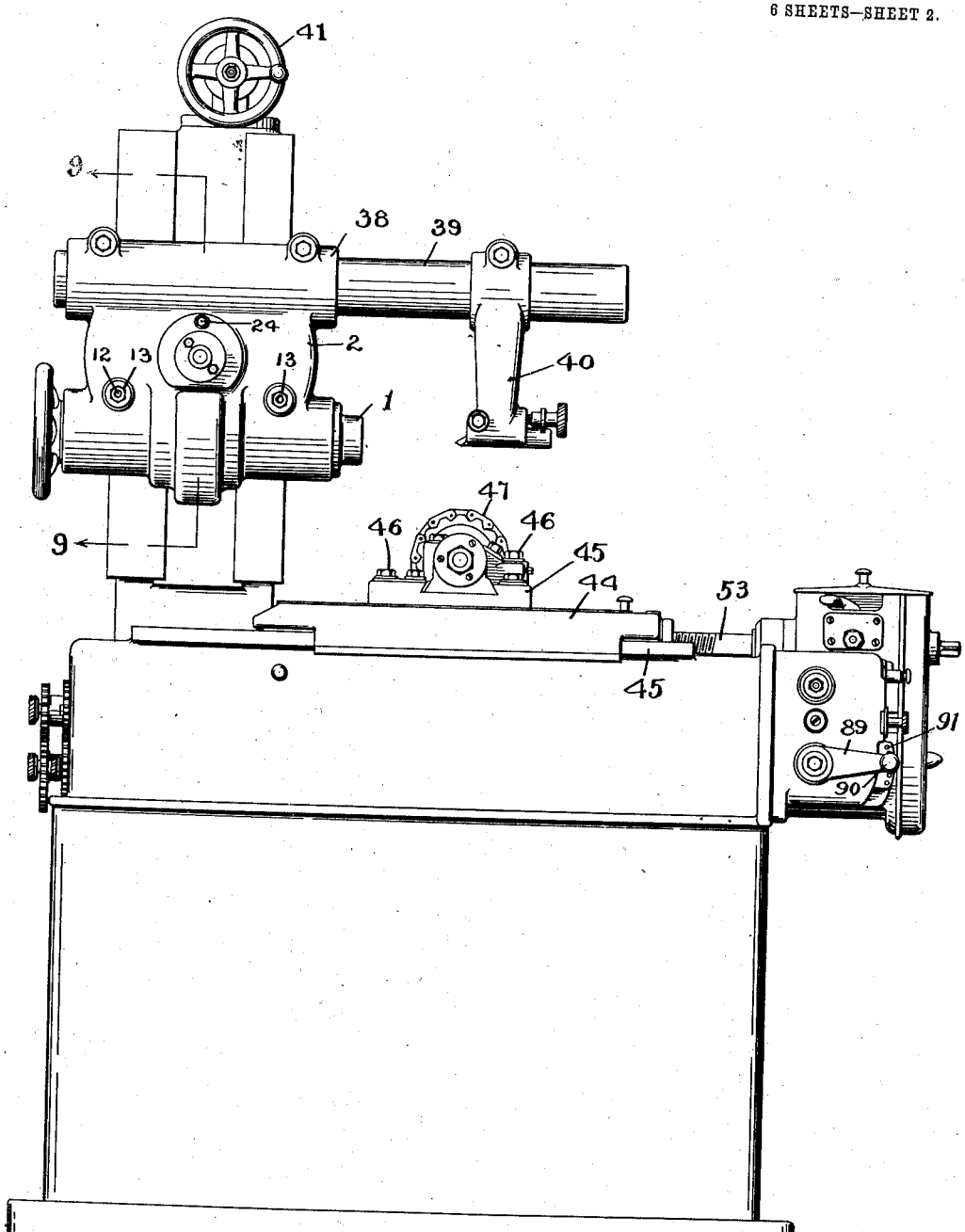
Figure 3:
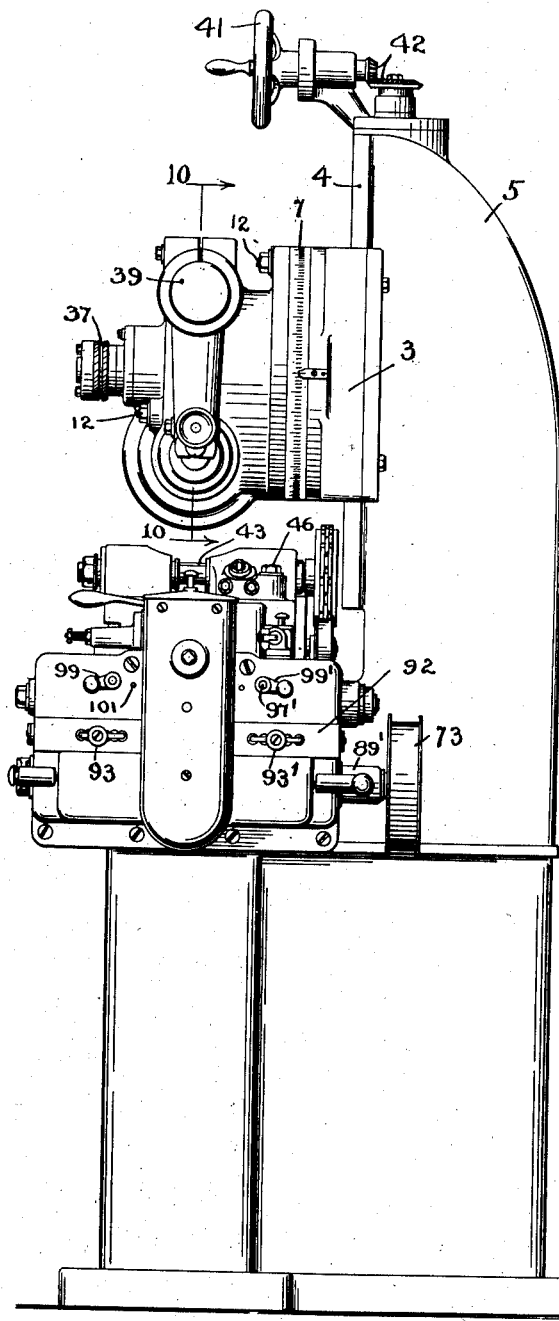
Figure 7:
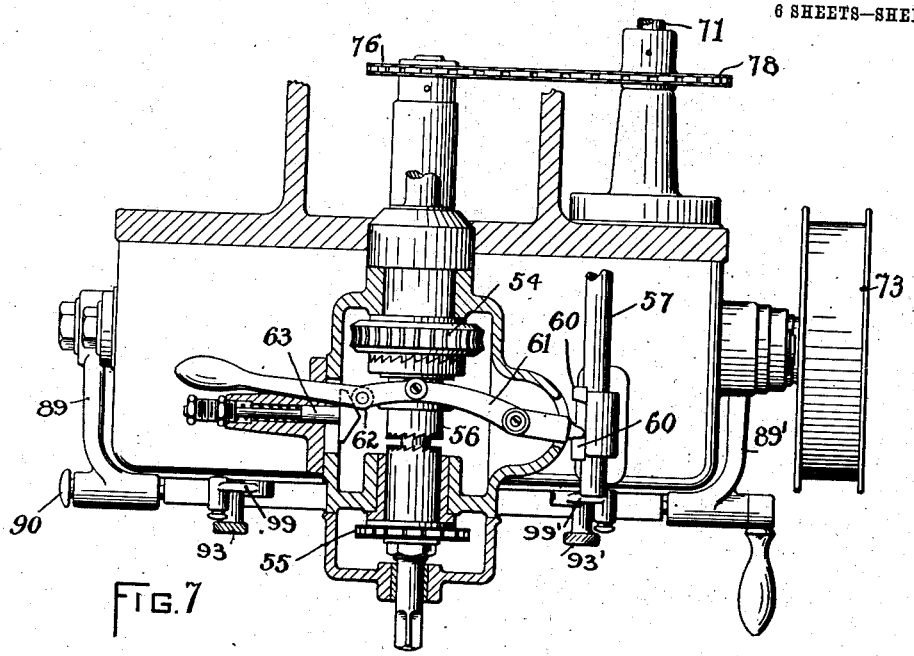
Figure 8:
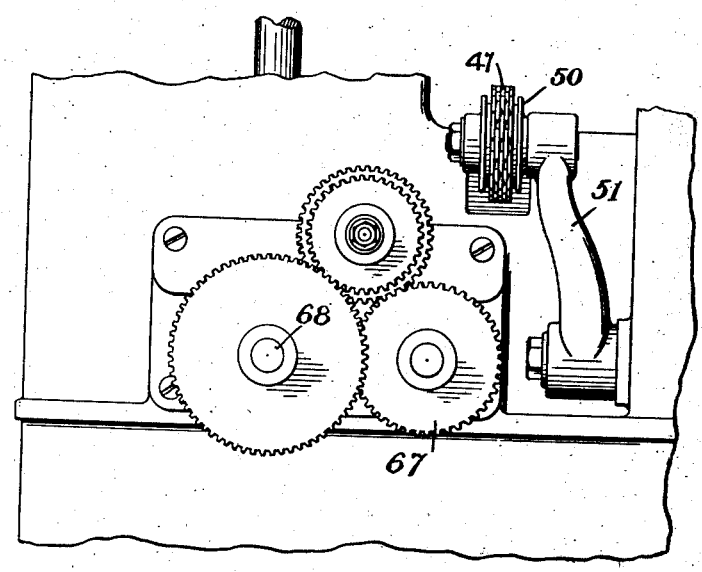
Figure 9:
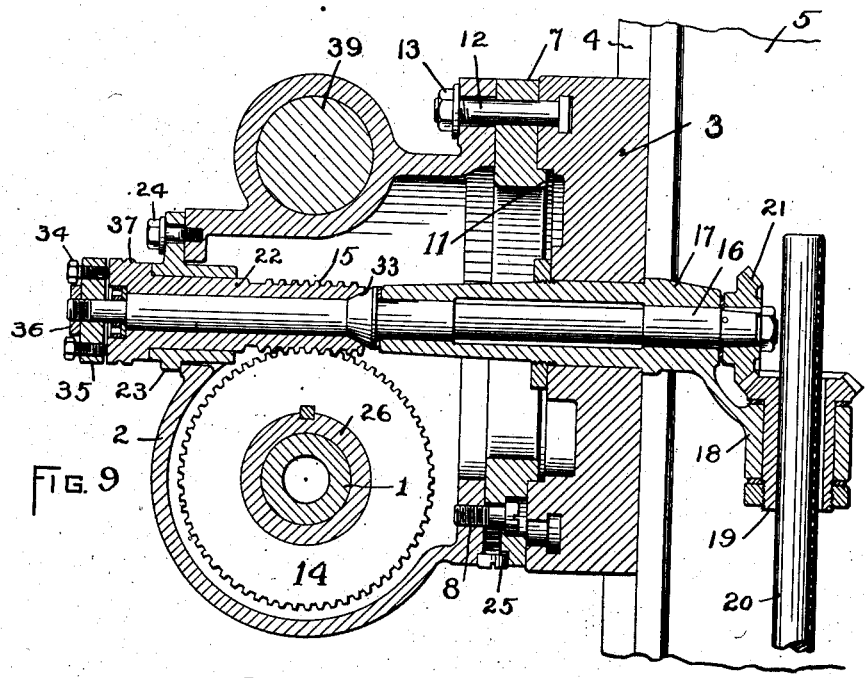
Figure 10:
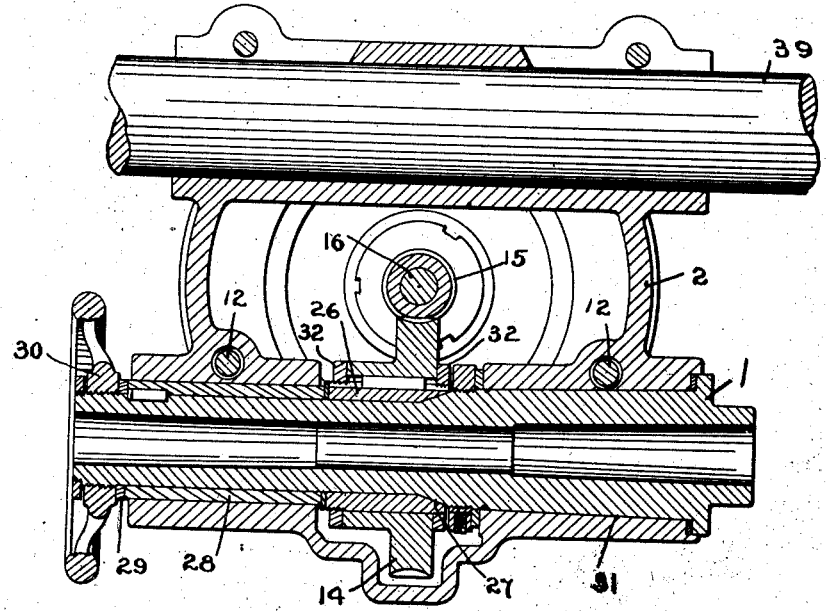

Figure 1 is a rear side elevation of the machine. Fig. 2 is a front side elevation. Fig. 3 is an end elevation. Fig. 4 is a transverse sectional view on line 4 4, Fig. 1. Fig. 5 is a sectional view on line 5 5, Fig. 4. Fig. 6 is a sectional view on line 6 6, Fig. 4. Fig. 7 is a horizontal sectional view on line 7 7, Fig. 4. Fig. 8 is a partial end elevation of the left end of the machine, Fig. 2. Fig. 9 is a vertical sectional view on line 9 9, Fig. 2. Fig. 10 is a vertical sectional view on line 10 10, Fig. 3.

In the machine shown in the drawings the work is supported upon a spindle 1, mounted in a head 2, which is carried by a slide 3, vertically adjustable on the ways 4 of the column 5. The head 2 is provided with a plate 7, to which the main part of the head is secured by bolts 8, so that the main part of the head may have a slight adjustment on the plate 7 for a purpose to be described. The plate 7 is provided with an annular flange 11, engaging a cylindrical recess in the slide 3, which forms a bearing in which the plate 7 and attached head 2 may be adjusted to vary the angle of the spindle 1. The head 2 and pla 7 thus form a swivel-head in which the spindle is carried, so that the spindle may be adjusted for gears of varying angle. The swivel-head is held in any adjusted position by means of bolts 12, provided with heads engaging an annular groove in the slide 3 and provided on their outer ends with nuts 13 for clamping the parts rigidly together.

The spindle 1 is rotated to index the work through an index worm-wheel 14, connected with the spindle and engaged by a worm 15, connected with a shaft 16, carried by the slide 3. The shaft 16 is mounted in a bushing 17, secured in the slide 3, and this bushing also carries a bearing 18, in which is mounted a bevel-gear 19, splined to a vertical shaft 20 and engaging a bevel-gear 21, secured to the shaft 16. The vertical shaft 20 is connected, by suitable gearing to be described, with the indexing mechanism. The shaft 16 is concentric with the axis about which the swivel-head 2 is adjustable, and the worm-wheel 14 therefore remains in engagement with the worm 15 in whatever position the spindle may be adjusted. The worm 15 is formed upon a sleeve 22, which has a bearing in a plate 23, secured to the head 2 by a bolt 24. In assembling the parts and bringing the worm-wheel into proper engagement with the worm 15 the head 2 may be adjusted slightly on the plate 7, the bolt 24 being loosened, so that the plate 23 may assume the proper position with relation to the head. This adjustment is permitted by a slight clearance between the bolts 12 and the holes in the head 2 through which they pass and the clearance between the bolts 8 and the holes in the plate 7 through which they pass. The adjustment of the head on the plate 7 may be effected by means of a screw 25. The head may also be adjusted on the plate 7, as above indicated, to take up any wear between the worm and worm-wheel, and thus keep them in accurate relation.

It is frequently desirable in setting up or adjusting the work to be able to turn the work independently of the indexing mechanism, and in order that this may be done without disconnecting the indexing-worm and worm-wheel the worm-wheel is so connected with the spindle that it may be readily disconnected or connected therewith at the will of the operator. For this purpose the worm-wheel is secured upon a sleeve 26, surrounding the spindle and provided with a conical surface 27, engaging a similar surface on the spindle. When the sleeve 26 is forced forward, the conical or tapered surfaces are forced together, thereby connecting the spindle and worm-wheel. When the sleeve 26 is released, the tapers are of such pitch that the sleeve automatically releases itself from the spindle, so that the spindle is free to turn in the sleeve. The sleeve 26 may be forced forward or released by means of a sleeve 28, keyed to the spindle, but having a limited play thereon and arranged between the sleeve 26 and a collar 29, which is engaged by the hub of a hand-wheel 30, threaded on the end of the spindle. By turning the hand-wheel the sleeve 28 may be forced forward, thus connecting the sleeve 26 with the spindle, or the pressure on the sleeve 28 may be released, thereby releasing the sleeve 26, so that the spindle may be turned independently.

The spindle is provided with a tapered bearing 31, and in order that the worm-wheel may be brought into accurate relation with the worm when the spindle is properly adjusted in its tapered bearing and when the tapers 27 on the sleeve 26 and spindle are in engagement the worm-wheel is connected with the sleeve 26 so that it may be adjusted longitudinally thereon. For this purpose the worm-wheel is connected with the sleeve by a key and keyway and is held in position on the sleeve by means of adjusting-nuts 32.

In order that the work way be adjusted with relation to the indexing mechanism in cutting opposite sides of the teeth or in making fine adujstments of the work to bring it into proper relation with the cutter, means are provided for readily disconnecting and connecting the worm 15 with the shaft 16 and for turning the worm independently of the shaft to adjust the work. For this purpose the sleeve 22, on which the worm 15 is formed, is provided with a taper 33, arranged to engage a corresponding taper on the shaft 16. When these tapered surfaces are forced together, the worm and shaft are connected to rotate in unison, and when the pressure on the sleeve 22 is relieved the tapers are of such pitch that the sleeve is automatically released and is free to rotate independent of the shaft. The sleeve 22 is forced forward to engage the tapers 33 by means of bolts 34, carried in a plate 35, held on the end of the shaft 16 by a nut 36. When the bolts 34 are loosened, the pressure on the sleeve 22 is relieved and the sleeve may be turned independently of the shaft 16 by means of the knurled head 37, which extends beyond the plate 23, in which the sleeve is mounted. The swivel-head 2 is provided with a bearing 38 for supporting the arm 39, to which the outboard-bearing 40 may be secured.

The spindle is provided with a socket at each end for receiving a work-supporting arbor, so that the work may be supported at either end of the spindle, according to the requirements of the particular piece of work being operated upon. When the work is supported at the end of the spindle to which the hand-wheel 30 is applied, this wheel may be removed, if found desirable, and a nut substituted therefor.

By providing the spindle with means for supporting the work at either end thereof pieces of work may be brought into proper relation with the cutter which could not be brought into such relation if the spindle were capable of supporting the work at only one end. Various pieces of work may also by this construction be held in a more nearly uniform position with relation to the travel of the cutter, so that the bed on which the cutter-carriage is mounted may be made shorter than would otherwise be practicable for the same range of work. The height of the spindle may be adjusted by moving the slide 3 vertically on the ways 4, this adjustment being effected by means of a handwheel 41, secured upon a shaft which is connected by bevel-gears 42 with adjusting devices. (Not shown.)

The cutter-spindle 43 is carried by a cutter-carriage 44, mounted to reciprocate on horizontal ways 45, formed on the bed of the machine. In order that the machine may be capable of performing a wide range of work with a short travel of the cutter-carriage, the cutter-spindle is mounted in the head 45, which may be adjusted longitudinally on the carriage to bring the cutter into proper relation with the work. This head is clamped rigidly in adjusted position by means of bolts 46.

The cutter-spindle is continuously driven during the reciprocation of the cutter-carriage by means of a chain or endless rack 47, provided with teeth which engage the teeth on a wheel or gear 48, secured to the cutter-spindle. This endless rack or chain 47 passes over the wheel 48 and under two idle pulleys 49, mounted on the cutter-head. From the idle pulleys 49 the chain passes in opposite directions, the rear loop of the chain being supported upon an idle pulley 50, carried by an arm 51 at the rear of the machine, and the front of the chain passing over a driving wheel or gear 52, Fig. 4. This endless driving chain or rack forms a simple and efficient drive for the cutter-spindle as the cutter-slide travels back and forth, and it also enables the cutter-head to be adjustably mounted on the cutter-slide without any complication of the driving mechanism for the spindle. It also enables the cutter-spindle to be longitudinally adjusted without involving any complications in the connections between the spindle and its driving mechanism, since the wheel 48 may move laterally with relation to the chain or rack 47 to accommodate such adjustment.

The cutter-carriage 44 is reciprocated through the rotation of a screw 53, which engages a nut on the slide. (Not shown.) This screw is rotated slowly in one direction to advance the cutter-carriage and is then rotated rapidly in the opposite direction to quickly return the cutter-carriage, the reversing of the screw being controlled by the movement of the cutter-carriage. A mechanism for reversing the movement of the cutter-carriage is shown in Figs. 1 and 7. The screw-shaft 53 is rotated in a direction to feed the cutter-carriage slowly forward by means of a worm-wheel 54, surrounding the shaft, and is rotated in a direction to quickly return the cutter-carriage by means of a sprocket-wheel 55, also surrounding the shaft. The shaft is connected with one or the other of these driving devices by means of a clutch 56, arranged between the hub of the worm-wheel and the hub of the sprocket-wheel and provided with clutch-teeth arranged to engage clutch-teeth on said hubs, the clutch being splined to the screw-shaft so as to rotate therewith, while being free to slide thereon.

The clutch 56 is shifted from one driving device to the other by means of a shifter-bar 57, on which are secured dogs 58, arranged in the path of a lug 59 on the cutter-carriage. When the cutter-carriage reaches the end of its forward stroke, the lug 59 strikes one of the dogs 58, shifting the bar 57 forward. As the bar 57 moves forward a lug 60 thereon operates upon the rear end of the clutch-shifting lever 61 and swings the lever about its pivot. As the lever 61 is moved by the bar 57 a roll 62 on said lever acts on the V-shaped end of a spring-plunger 63, forcing said plunger back until the roll passes the point of the V, when the plunger springs forward, thus shifting the clutch 56 quickly from engagement with the worm-wheel 54 into engagement with the sprocket-wheel 55. The cutter-carriage is now quickly returned until the lug 59 strikes the other dog 58, when the bar 57 is shifted in the opposite direction. In this movement of the bar a second lug 60 acts upon the clutch-shifting lever 61 to move it in the opposite direction, so that the clutch is shifted back into engagement with the worm-wheel 54.

As the bar 57 is shifted at the end of the return stroke of the cutter-carriage the indexing mechanism, which is located in the index-box 64, Fig. 1, is thrown into operation to index the work. This indexing mechanism is of a well-known form and is tripped by a dog carried by the collar 65, secured to the reversing-bar 57. The indexing mechanism is connected with the vertical shaft 20, through which the work-spindle is rotated by means of a shaft 66, connected by gearing 67 with a shaft 68, carrying a bevel-gear 69, which meshes with a bevel-gear 70 on said vertical shaft, Figs. 1 and 8. The indexing mechanism is operated from a constantly-rotating shaft 71.

The driving mechanism for driving the index-shaft 71 and the sprocket-wheel 55 for quickly returning the cutter-carriage at constant speeds and for driving the cutter-spindle and the worm 54 for slowly feeding the cutter-carriage forward at any one of a number of different speeds is compactly and conveniently arranged in a casing at the end of the machine. These mechanisms are all driven from a driving-shaft 72, provided with a pulley 73, to which power may be applied. The index-shaft 71 and the sprocket-wheel 55 for returning the cutter-carriage are driven from the shaft 72 through a spiral gear 73, which engages a spiral gear 74, secured to a shaft 75. This shaft 75 is provided with two sprocket-wheels 76 77, the sprocket-wheel 76 being connected with the shaft 71 by a sprocket-chain 78, which passes over the sprocket-wheel on the shaft 71, and the sprocket-wheel 77 being connected with the sprocket-wheel 55 by a sprocket-chain 79.

The worm-wheel 54 may be driven at any one of twelve different speeds by means of a variable-speed gearing interposed between the shaft 72 and said worm-wheel. This variable-speed gearing consists of an elongated pinion 80, formed on the shaft 72, which may be connected with any one of six gears 81 by means of an intermediate gear 82. The intermediate gear 82 is loosely mounted upon a shaft 83, carried by a frame 84, arranged to swing about the axis of the shaft 72. The intermediate gear 82 may be moved along the shaft 83 to bring it into position to engage any one of the gears 81 by means of a slide 85, provided with arms 86, projecting on opposite sides of the gear. By moving the frame 84 about the axis of the shaft 72 the intermediate gear 82 may be brought into mesh with any one of the gears 81. The frame 84 is mounted upon one side upon the bushing 87, which forms one of the bearings for the shaft 72, and is secured on the other side to a sleeve 88, forming another bearing for the shaft 72 and extending outside of the casing. The sleeve 88 is provided with an arm 89 outside the casing, by which the position of the sleeve 88 and the attached frame 87 may be varied. The arm 89 may be held in any one of the six positions corresponding to the positions of the intermediate gear 82 when in engagement with each of the six gears 81 by means of a pin 90, arranged to engage a series of holes 91 in the casing, Fig. 2.

The slide 85, by which the gear 82 is adjusted along the rod 83, is guided in the recess in the front of the casing, being held in the recess by a plate 92, Figs. 3 and 5. The plate, and consequently the gear 82, may be held in any one of its adjusted positions by means of a sleeve 93, mounted upon a stud projecting from the slide 85 through a slot in the plate 92, the plate being provided with a series of recesses to receive the end of the sleeve 93. The gear 82 is adjusted by withdrawing the sleeve 93 from a recess in the plate 92, shifting the slide 85 laterally, and engaging the sleeve 93 with the proper recess.

Motion is transmitted from the gears 81 to the worm-wheel 54 through a shaft 94, which carries at its inner end a worm 95, engaging the worm-wheel, Figs. 4 and 6. A quill-gear 96 is keyed to slide upon shaft 94 and is provided with a large gear arranged to engage the smaller of the two center gears 81 and with a small gear arranged to engage the largest gear 81. The quill-gear may be adjusted to bring either of its gears into engagement with the corresponding gear 81 by means of a shaft 97, provided at its inner end with a pinion 98, engaging annular teeth formed in the sleeve of the quill-gear, and provided on its outer end with an operating-arm 99. The quill-gear is held in either one of its adjusted positions by means of a pin 100, carried by the arm 99 and arranged to engage either one of two holes 101 in the front of the casing. By this variable-speed gearing the worm-wheel 54 may be driven at any one of twelve different speeds, and the change from one speed to another may be quickly and conveniently effected by the operator. The casing may be provided with proper scales to indicate the speed of the cutter-carriage corresponding to the different adjustments of the slide 85 and the arm 99.

The cutter-spindle may be driven from the shaft 72 at any one of ten different speeds by means of a variable-speed gearing similar to the gearing already described for driving the worm-wheel 54. This variable-speed mechanism connects the shaft 72 with a shaft 102, upon which the gear or sprocket wheel 52, which carries the driving-chain or rack 47, is carried. Motion is transmitted from shaft 72 to shaft 102 through an elongated gear 80', which is connected, by means of an intermediate gear corresponding to the gear 82, (shown in Fig. 5,) with any one of five gears 81', which in turn may be connected with the shaft 102 by either one of the gears of a quill-gear 96', keyed to slide on the shaft 102. The intermediate gear is adjusted by means of an arm 89', secured to the frame 84', which carries the intermediate gear of a slide corresponding to the slide 85, which is held in adjusted position by means of a sleeve 93', corresponding to the sleeve 93, already described. The quill-gear 96' is adjusted by means of a shaft 97', provided with a pinion 98' and an operating-arm 99', similar to the parts already described for adjusting the quill-gear 96.

This construction and arrangement of gearing for driving the various parts of the machine is simple in construction and compact in arrangement and is all located where it is readily and conveniently accessible to the operator in making any desired changes or adjustments.

What I claim, and desire to secure by Letters Patent, is—

1. A machine for cutting bevel or spur gears having in combination a cutter-carriage, a reciprocating mechanism therefor, a cutter-spindle mounted on the carriage, mechanism for rotating the spindle during the reciprocation of the carriage, a work-spindle, a swivel-head carrying said spindle, a vertically-adjustable slide on which said head is mounted, and indexing mechanism for the work-spindle, substantially as described.

2. A machine for cutting bevel or spur gears having in combination a cutter-carriage, a reciprocating mechanism therefor, a cutter-spindle mounted on the carriage, mechanism for rotating the spindle during reciprocation of the carriage, a work-spindle, a swivel-head carrying said spindle adjustable about an axis parallel to the cutter-spindle, a slide on which said head is mounted adjustable at right angles to the movement of the cutter-carriage, and indexing mechanism for the cutter-spindle, substantially as described.

3. A machine for cutting bevel or spur gears having in combination a cutter-carriage, reciprocating mechanism therefor, a cutter-spindle mounted on the carriage, a work-spindle, a head in which said spindle is mounted adjustable to vary the inclination of the work-spindle, and indexing mechanism for the work-spindle, substantially as described.

4. A machine for cutting bevel or spur gears having in combination a cutter-carriage mounted to travel in a fixed path, reciprocating mechanism for the carriage, a cutter-spindle mounted on the carriage, a work-spindle, a swivel-head carrying said spindle adjustable about an axis parallel to the axis of the cutter-spindle, and indexing mechanism for the work-spindle, substantially as described.

5. A machine for cutting bevel or spur gears having in combination a reciprocating cutter-carriage, a rotary cutter-spindle mounted thereon, a work-spindle provided with means for supporting the work at either end, a swivel-head carrying said spindle, and an adjustable slide on which the head is mounted, whereby either end of the spindle may be brought into proper relation to act upon the work carried thereby, substantially as described.

6. A machine for cutting bevel or spur gears having in combination, a reciprocating cutter-carriage, a work-spindle, a swivel-head carrying said spindle and means for supporting the work at either end of the spindle, whereby either end of the spindle may be brought into proper relation for the cutter to act upon the work carried thereby, substantially as described.

7. The combination with a reciprocating cutter-carriage, of a head adjustable longitudinally thereon, a cutter-spindle mounted in said head and mechanism for rotating said spindle, substantially as described.

8. A gear-cutting machine having in combination, a main driving-shaft, two cone-gears parallel to said shaft, adjustable intermediate gears for connecting the cone-gears with the main driving-shaft, a cutter-carriage, connections between one of said cone-gears and the cutter-carriage for feeding the same forward, and connections between the other cone-gear and the cutter-spindle for driving the spindle, substantially as described.

9. A gear-cutting machine having in combination, a driving-shaft 72 provided with two elongated gears, two cone-gears corresponding to said elongated gears, an adjustable intermediate gear for connecting each elongated gear with its cone-gear, a cutter-carriage, connections between one of said cone-gears and the carriage for feeding the same forward, a cutter-spindle on the carriage, and connections between the other cone-gear and the spindle for driving said spindle, substantially as described.

10. A machine for cutting bevel or spur gears, having in combination a work-supporting spindle, a head in which said spindle is mounted, a plate provided with a cylindrical bearing in which it may be adjusted, an index worm-wheel connected with the spindle, an index-worm mounted concentric with the bearing of said plate, and means for adjustably securing said head on said plate, substantially as described.

11. A machine for cutting bevel or spur gears, having in combination a work-supporting spindle, a head in which said spindle is mounted, a swivel-plate on which said head is adjustably secured, a vertically-adjustable slide carrying said plate, an index worm-wheel connected with the spindle, an index-worm mounted concentric with the swivel-plate, and gearing connecting the work with the indexing mechanism, substantially as described.

12. A machine for cutting bevel or spur gears, having in combination a work-supporting spindle, a head in which said spindle is mounted, a swivel-plate on which said head is adjustably secured, an index worm-wheel connected with the spindle, an index-worm mounted concentric with said swivel-head, a vertically-adjustable slide on which said plate is mounted, a vertical shaft connected with the indexing mechanism, and gearing carried by said slide connecting said shaft with said worm, substantially as described.

13. A gear-cutting machine having in combination, a work-supporting spindle, an index worm-wheel connected therewith, an index-worm engaging said worm-wheel, a worm-shaft on which said worm is mounted, means for connecting and disconnecting the worm and worm-shaft, and means for turning the worm manually independently of the worm-shaft, substantially as described.

14. A gear-cutting machine having in combination, a work-supporting spindle, an index worm-wheel connected therewith, an index-worm engaging said wheel, an index-shaft, a clutch for connecting said worm and shaft, and means for manually turning the worm when disconnected from the shaft, substantially as described.

15. A gear-cutting machine having in combination, a work-supporting spindle, an index worm-wheel connected therewith, a worm-shaft provided with a taper, an index-worm mounted on said shaft and provided with a corresponding taper, means for forcing said tapers together, and means for turning the worm independently of the shaft when the frictional engagement of the tapers is relieved, substantially as described.

16. A gear-cutting machine having in combination, a work-supporting spindle, an index-worm connected therewith, a worm-shaft provided with a taper, a worm-sleeve mounted on said shaft and provided with a corresponding taper, a head on said worm-sleeve by which it may be turned, and means for forcing said sleeve forward to engage the tapers or relieving the pressure on the sleeve, substantially as described.

17. A gear-cutting machine having in combination, a work-supporting spindle, an index worm-wheel connected therewith, an index-worm engaging said wheel, and means for connecting and disconnecting the worm-wheel with the spindle at will whereby the work-spindle may be turned independently of the indexing mechanism without disconnecting the indexing-worm and worm-wheel, substantially as described.

18. A gear-cutting machine having in combination, a work-supporting spindle, an index worm-wheel mounted thereon, a friction-clutch between the worm-wheel and spindle for connecting and disconnecting the same, and an index-worm engaging the worm-wheel, substantially as described.

19. A gear-cutting machine having in combination, a work-supporting spindle provided with a taper, a sleeve mounted thereon provided with a corresponding taper, an index worm-wheel on said sleeve, an index-worm engaging said worm-wheel, and means for forcing said sleeve forward to engage said tapers or relieving the pressure on said sleeve, substantially as described.

20. A gear-cutting machine having in combination, a work-supporting spindle provided with a taper, a taper bearing in which said spindle is mounted, a sleeve mounted on said spindle provided with a taper for engaging the taper on the spindle, and an index worm-wheel adjustably mounted on said sleeve, substantially as described.

JOHN PARKER.

Witnesses:
W. H. THURSTON,
J. H. THURSTON.